United States Patent [19]
Williams

[11] Patent Number: 5,964,160
[45] Date of Patent: Oct. 12, 1999

[54] TABLE FOR SUPPORTING A GRILL

[76] Inventor: Ronald P. Williams, 6461 W. Viking Rd., Las Vegas, Nev. 89103

[21] Appl. No.: 09/156,122

[22] Filed: Sep. 17, 1998

[51] Int. Cl.[6] .................................................. A47B 17/00
[52] U.S. Cl. ............................................... 108/27; 108/60
[58] Field of Search .................... 188/27, 17, 60, 188/55.1; 312/194, 140.4

[56] References Cited

U.S. PATENT DOCUMENTS

| | | | |
|---|---|---|---|
| 3,034,153 | 5/1962 | Sargent | 108/27 X |
| 3,389,947 | 6/1968 | Kelley et al. | 108/60 X |
| 3,433,364 | 3/1969 | Chen | 108/60 X |
| 3,601,065 | 8/1971 | Sargent | 108/27 |

FOREIGN PATENT DOCUMENTS

| | | | |
|---|---|---|---|
| 554845 | 6/1923 | France | 108/27 |
| 2202198 | 7/1973 | Germany | 108/27 |
| 405053 | 2/1934 | United Kingdom | 108/27 |

*Primary Examiner*—Jose V. Chen

[57] ABSTRACT

A table for supporting a grill that is designed to block wind from a grill, such as a portable grill, that is rested on the table. The table includes a rectangular bottom panel that has an upper surface, a lower surface, a front, and a back. A back panel that has a front surface, a rear surface, and a pair of ends is hingedly coupled to the back of the bottom panel and is pivotable between a deployed position and a retracted position. First and second side panels are hingedly coupled to a respective end of the back panel and are pivotable between an open position and a closed position. Each of the side panels has an inner surface and an outer surface. A pair of legs are hingedly coupled to the lower surface of the bottom panel and are pivotable between an extended position and a collapsed position.

20 Claims, 3 Drawing Sheets

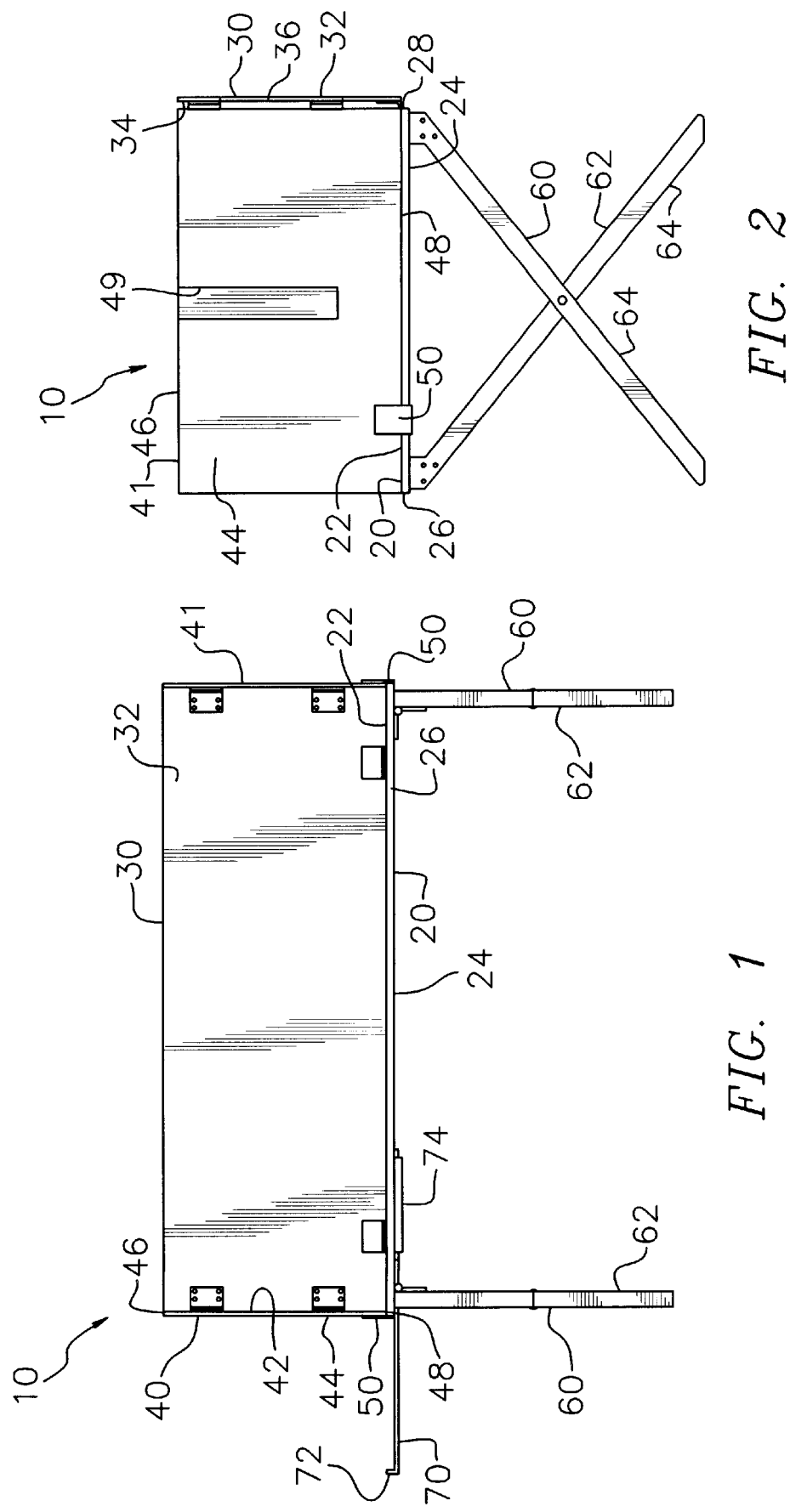

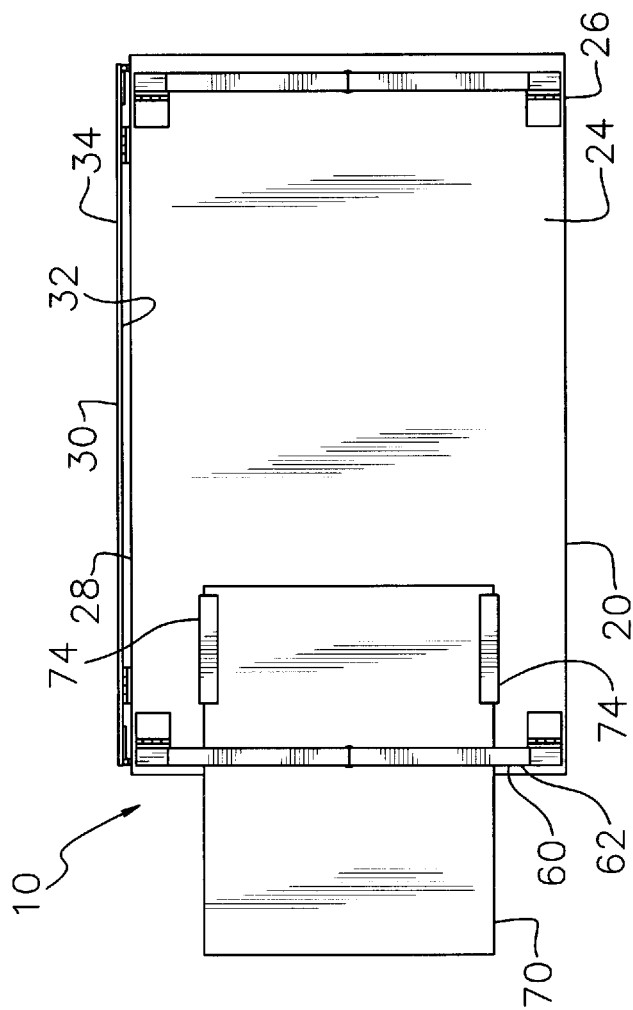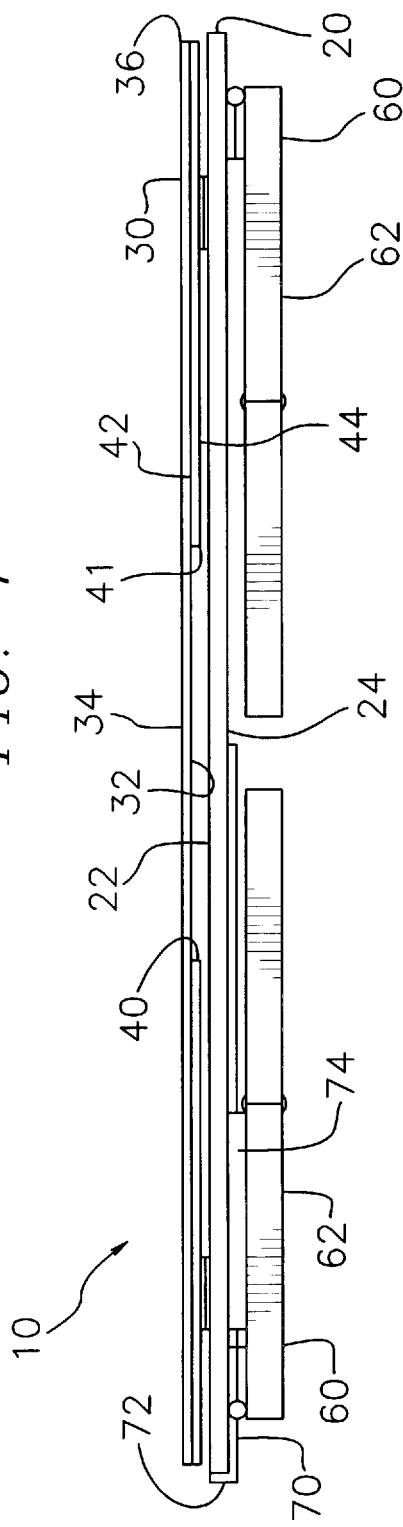

TABLE FOR SUPPORTING A GRILL

BACKGROUND OF THE INVENTION

1. Field of the Invention

The present invention relates to table assemblies and more particularly pertains to a new table for supporting a grill for blocking wind from the grill.

2. Description of the Prior Art

The use of table assemblies is known in the prior art. More specifically, table assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art table assemblies include U.S. Pat. No. 4,889,725; U.S. Pat. No. 4,321,857; U.S. Pat. Des. 342,121; U.S. Pat. No. 4,949,701; U.S. Pat. No. 5,318,322; and U.S. Pat. No. 4,984,515.

While these devices fulfill their respective, particular objectives and requirements, the aforementioned patents do not disclose a new table for supporting a grill. The inventive device includes a rectangular bottom panel that has an upper surface, a lower surface, a front, and a back. A back panel that has a front surface, a rear surface, and a pair of ends is hingedly coupled to the back of the bottom panel and is pivotable between a deployed position and a retracted position. First and second side panels are hingedly coupled to a respective end of the back panel and are pivotable between an open position and a closed position. Each of the side panels has an inner surface and an outer surface. A pair of legs are hingedly coupled to the lower surface of the bottom panel and are pivotable between an extended position and a collapsed position.

In these respects, the table for supporting a grill according to the present invention substantially departs from the conventional concepts and designs of the prior art, and in so doing provides an apparatus primarily developed for the purpose of blocking wind from the grill.

SUMMARY OF THE INVENTION

In view of the foregoing disadvantages inherent in the known types of table assemblies now present in the prior art, the present invention provides a new table for supporting a grill construction wherein the same can be utilized for blocking wind from the grill.

The general purpose of the present invention, which will be described subsequently in greater detail, is to provide a new table for supporting a grill apparatus and method which has many of the advantages of the table assemblies mentioned heretofore and many novel features that result in a new table for supporting a grill which is not anticipated, rendered obvious, suggested, or even implied by any of the prior art table assemblies, either alone or in any combination thereof.

To attain this, the present invention generally comprises a rectangular bottom panel that has an upper surface, a lower surface, a front, and a back. A back panel that has a front surface, a rear surface, and a pair of ends is hingedly coupled to the back of the bottom panel and is pivotable between a deployed position and a retracted position. First and second side panels are hingedly coupled to a respective end of the back panel and are pivotable between an open position and a closed position. Each of the side panels has an inner surface and an outer surface. A pair of legs are hingedly coupled to the lower surface of the bottom panel and are pivotable between an extended position and a collapsed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new table for supporting a grill apparatus and method which has many of the advantages of the table assemblies mentioned heretofore and many novel features that result in a new table for supporting a grill which is not anticipated, rendered obvious, suggested, or even implied by any of the prior art table assemblies, either alone or in any combination thereof.

It is another object of the present invention to provide a new table for supporting a grill which may be easily and efficiently manufactured and marketed.

It is a further object of the present invention to provide a new table for supporting a grill which is of a durable and reliable construction.

An even further object of the present invention is to provide a new table for supporting a grill which is susceptible of a low cost of manufacture with regard to both materials and labor, and which accordingly is then susceptible of low prices of sale to the consuming public, thereby making such table for supporting a grill economically available to the buying public.

Still yet another object of the present invention is to provide a new table for supporting a grill which provides in the apparatuses and methods of the prior art some of the advantages thereof, while simultaneously overcoming some of the disadvantages normally associated therewith.

Still another object of the present invention is to provide a new table for supporting a grill for blocking wind from the grill.

Yet another object of the present invention is to provide a new table for supporting a grill which includes a rectangular bottom panel that has an upper surface, a lower surface, a front, and a back. A back panel that has a front surface, a rear surface, and a pair of ends is hingedly coupled to the back of the bottom panel and is pivotable between a deployed position and a retracted position. First and second side panels are hingedly coupled to a respective end of the back panel and are pivotable between an open position and a closed position. Each of the side panels has an inner surface and an outer surface. A pair of legs are hingedly coupled to the lower surface of the bottom panel and are pivotable between an extended position and a collapsed position.

Still yet another object of the present invention is to provide a new table for supporting a grill that helps prevent wind from removing heat from the grill and blowing out flames burning in the grill.

Even still another object of the present invention is to provide a new table for supporting a grill that includes pivotable legs for permitting use of the table on the ground with the legs in an extended position or on a table or similar surface with the legs in a collapsed position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new table for supporting a grill according to the present invention.

FIG. 2 is a schematic side view of the present invention.

FIG. 4 is a schematic side view of the present invention.

FIG. 5 is a schematic side view of the present invention particularly illustrating the back panel in a retracted position, the side panels in a closed position, and the legs in a collapsed position.

DESCRIPTION OF THE PREFERRED EMBODIMENT

Figure 3:
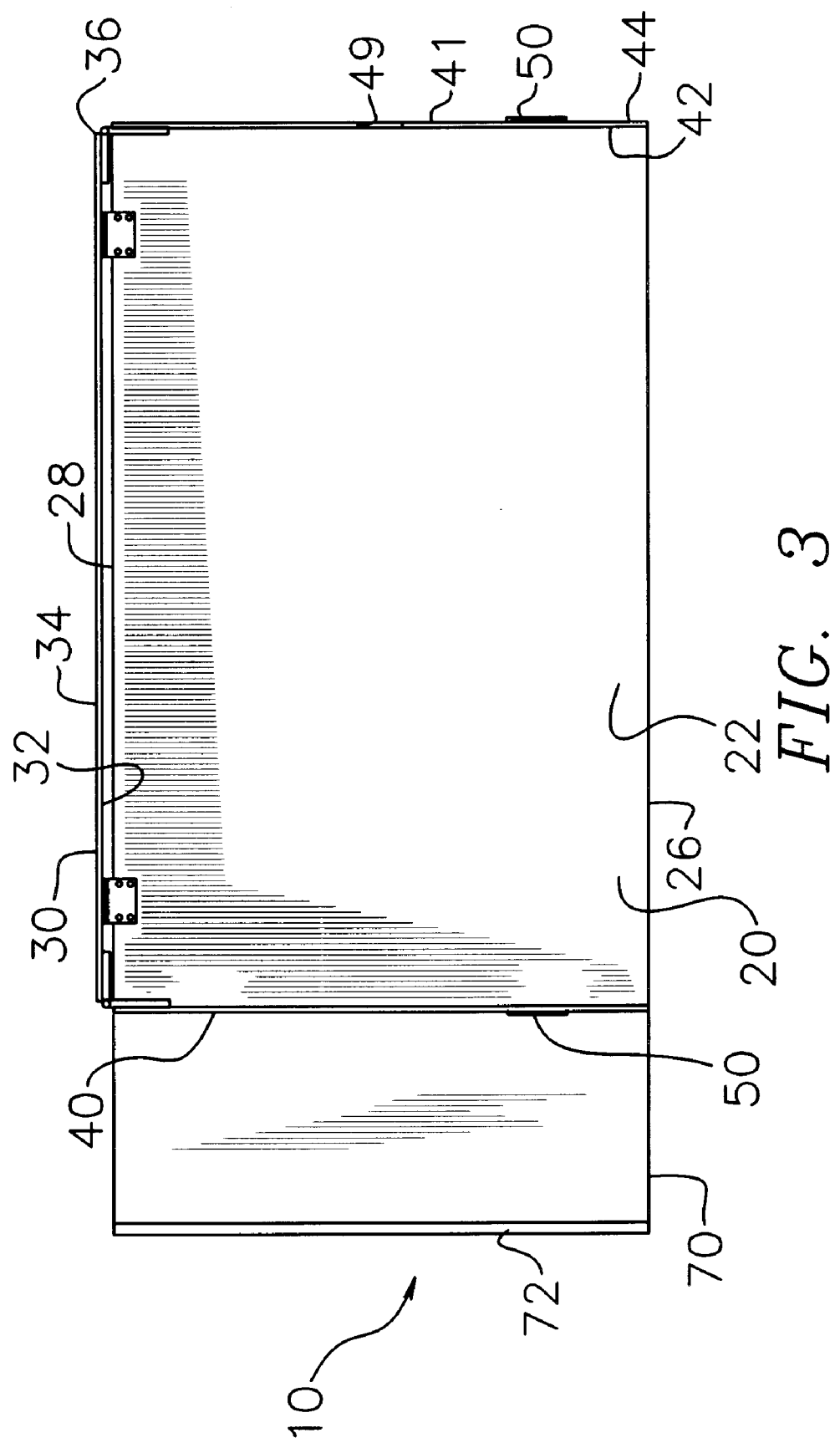
FIG. 3 is a schematic side view of the present invention.

With reference now to the drawings, and in particular to FIGS. 1 through 5 thereof, a new table for supporting a grill embodying the principles and concepts of the present invention and generally designated by the reference numeral 10 will be described.

As best illustrated in FIGS. 1 through 5, the table for supporting a grill 10 generally comprises a bottom panel 20 that has an upper surface 22, a lower surface 24, a front 26, and a back 28. A back panel 30 extends from the upper surface 22 of the bottom panel 20 and is hingedly coupled to the back 28 of the bottom panel 20. The back panel 30 has a front surface 32, a rear surface 34, and a pair of ends 36. First and second side panels 40,41 extend from the front surface 32 of the back panel 30 and are hingedly coupled to a respective end 36 of the back panel 30. Each of the side panels 40,41 has an inner surface 42 and an outer surface 44. The table 10 is designed to block wind from a grill, such as a portable grill, that is rested on the upper surface 22 of the bottom panel 20.

The bottom panel 20 is preferably rectangular and about less than four feet long by about less than eighteen inches wide.

Preferably, as shown in FIGS. 1, 3 and 5, the back panel 30 is generally rectangular and is pivotable between a deployed position and a retracted position for more compact storage. In such an embodiment, the front surface 32 of the back panel 30 is positioned substantially perpendicular the upper surface 22 of the bottom panel 20 when the back panel 30 is in a deployed position. The front surface 32 of the back panel 30 is positioned substantially parallel the upper surface 22 of the bottom panel 20 when the back panel 30 is in a retracted position. The back panel 30 is preferably about less than four feet long by about less than two feet wide.

Also preferably, each of the side panels 40,41 is generally rectangular and is pivotable between an open position and a closed position for more compact storage. As illustrated in FIGS. 1 and 3, each of the inner surfaces 42 of the side panels 40,41 are positioned substantially perpendicular the front surface 32 of the back panel 30 when the side panels 40,41 are in an open position. As shown in FIG. 5, the inner surfaces 42 of the side panels 40,41 are positioned substantially parallel the front surface 32 of the back panel 30 when the side panels 40,41 are in a closed position. Each of the side panels 40,41 is preferably about less than eighteen inches long by about less than two feet wide.

Preferably, the table 10 further comprises a support structure 60 that supports the bottom panel 20 in a spaced apart relation from a surface such as the ground or a picnic table. As illustrated in FIGS. 1 and 2, the support structure 60 extends from the lower surface 24 of the bottom panel 20. The support structure 60 is pivotally coupled to the lower surface 24 of the bottom panel 20.

Ideally, the support structure 60 comprises a pair of legs 62 that are hingedly coupled to the lower surface 24 of the bottom panel 20. Even more ideally, each of the legs 62 is pivotable between an extended position and a collapsed position for more compact storage. The legs 62 are positioned generally perpendicular the lower surface 24 of the bottom panel 20 when the legs 62 are in the deployed position. The legs 62 are positioned generally parallel the lower surface 24 of the bottom panel 20 when the legs 62 are in the retracted position. Most ideally, as shown in FIG. 2, each of the legs 62 is generally X-shaped. In such an embodiment, each leg 62 has a pair of elongate members 64 that are coupled together at a midpoint. The preferred length of the legs 62 is less than about three feet.

In an alternate embodiment, the legs 62 are removably coupled to the lower surface 24 of the bottom panel 20. In such an embodiment, the legs 62 may be removed and the elongate members 64 of the legs 62 may be folded together from an unfolded position into a folded position such that when the legs 62 are in a folded position, the elongate members 64 are substantially parallel each other for more convenient transport and storage.

Preferably, a shelf member 70 that is generally rectangular is slidably extendible from the lower surface 24 of the bottom panel 20. Even more preferably, the shelf member 70 has a flanged end 72 for easier grasping when extending the shelf member 70 as well as helping keep objects placed on the shelf member 70 from sliding or rolling off of the shelf member 70.

Also preferably, as shown in FIG. 4, a pair of guide members 74 are coupled to the lower surface 24 of the bottom panel 20. The shelf member 70 is slidably insertable between the guide members 74 such that the shelf member 70 rests on the guide members 74. The flanged end 72 of the shelf member 70 keeps the shelf member 70 from sliding through and out of the back of the guide members 74. The shelf member 70 may also include a pair of stops that prevent the back of the shelf member 70 from sliding through the guide members 74.

Preferably, a pair of fasteners 50 extend from the bottom panel 20. One of the fasteners 50 couples one of the side panels 40,41 to the bottom panel 20 when the side panel 40 is in an open position to hold the side panel 40 in an open position despite the exertion of force on the side panel 40, such as by wind. Another of the fasteners couples another of the side panels 41 to the bottom panel 20 when the side panel 40 is in an open position. Ideally, each of the fasteners 50 comprises a hooks and loops fastener.

Also preferably, each of the side panels 40,41 has an upper edge 46 and a lower edge 48. One of the side panels 41 has a slot 49 extending from the upper edge 46 of the side panel 41 towards the lower edge 48 of the side panel 41. For example, the slot 49 may receive a gas hose that extends between a portable gas grill and a fuel tank.

In the preferred embodiment, the table 10 is constructed of a lightweight yet flame retardant material, such as fiberglass or aluminum.

In use, the legs 62 are placed in an extended position. The back panel 30 is placed in a deployed position. The side panels 40 are placed in an open position and the fasteners 50 couple the side panels 40,41 to the bottom panel 20 to hold the side panels 40,41 in an open position. The table 10 is preferably positioned such that the rear surface 34 of the back panel 30 is facing into the wind. A grill or other object is placed on the upper surface 22 of the bottom panel 20. The back 28 and side panels 40,41 are designed to prevent wind from removing heat from the grill and extinguishing flames burning in the grill. The shelf member 70 may be extended such that the flanged end 72 of the shelf member 70 is spaced apart from the bottom panel 20.

When not in use, the side panels 40,41 are placed in a closed position. The back panel 30 is placed in a retracted position. The shelf member 70 is slid towards the bottom panel 20 such that the flanged end 72 of the shelf member 70 is adjacent the bottom panel 20. The legs 62 are placed in a collapsed position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A table for supporting a grill, said table comprising:
   a bottom panel having an upper surface, a lower surface, a front, and a back;
   a back panel being extended from said upper surface of said bottom panel, said back panel having a front surface, a rear surface, and a pair of ends, said back panel being hingedly coupled to said back of said bottom panel;
   first and second side panels being extended from said front surface of said back panel, each of said side panels having an inner surface and an outer surface, each of said side panels being hingedly coupled to a respective said end of said back panel; and
   a shelf member being slidably mounted on said lower surface of said bottom member.

2. The table of claim 1, wherein said back panel is pivotable between a deployed position and a retracted position, said front surface of said back panel being positioned substantially perpendicular said upper surface of said bottom panel when said back panel is in said deployed position, said front surface of said back panel being positioned substantially parallel said upper surface of said bottom panel when said back panel is in said retracted position.

3. The table of claim 1, wherein each of said side panels is pivotable between an open position and a closed position, each of said inner surfaces of said side panels being positioned substantially perpendicular said front surface of said back panel when said side panels are in said open position, said front surfaces of said side panels being positioned substantially parallel said front surface of said back panel when said side panels are in said closed position.

4. The table of claim 3, further comprising a pair of fasteners being extended from said bottom panel, one of said fasteners coupling one of said side panels to said bottom panel and another of said fasteners coupling another of said side panels to said bottom panel when said side panels are in said open position.

5. The table of claim 4, wherein each of said fasteners comprises a hooks and loops fastener.

6. The table of claim 1, wherein each of said side panels has an upper edge and a lower edge, one of said side panels having a slot extending from said upper edge of said side panel towards said lower edge of said side panel.

7. The table of claim 1, further comprising a support structure for supporting said bottom panel in a spaced apart relation from a surface, said support structure being extended from said lower surface of said bottom panel.

8. The table of claim 7, wherein said support structure comprises a pair of legs being hingedly coupled to said lower surface of said bottom panel.

9. The table of claim 8, wherein each of said legs is pivotable between an extended position and a collapsed position, said legs being positioned generally perpendicular said lower surface of said bottom panel when said legs are in said deployed position, said legs being positioned generally parallel said lower surface of said bottom panel when said legs are in said retracted position.

10. The table of claim 8, wherein each of said legs is generally X-shaped, each said leg having a pair of elongate members being coupled together at a midpoint.

11. The table of claim 1, wherein said shelf member has a flanged end.

12. The table of claim 1, further comprising a pair of guide members being coupled to said lower surface of said bottom panel, and a shelf member being slidably rested on said guide members.

13. A table for supporting a grill, said table comprising:

a bottom panel being generally rectangular, said bottom panel having an upper surface and a lower surface, said bottom panel having a front and a back;

a back panel being generally rectangular and extending from said bottom panel, said back panel having a front surface and a rear surface, said back panel being hingedly coupled to said back of said bottom panel, said back panel having a pair of ends;

wherein said back panel is pivotable between a deployed position and a retracted position, said front surface of said back panel being positioned substantially perpendicular said upper surface of said bottom panel when said back panel is in said deployed position, said front surface of said back panel being positioned substantially parallel said upper surface of said bottom panel when said back panel is in said retracted position;

first and second side panels being generally rectangular and extending from said back panel, each of said side panels having an inner surface and an outer surface, each of said side panels having an upper edge and a lower edge, each of said side panels being hingedly coupled to a respective said end of said back panel;

wherein each of said side panels is pivotable between an open position and a closed position, each of said inner surfaces of said side panels being positioned substantially perpendicular said front surface of said back panel when said side panels are in said open position, said front surfaces of said side panels being positioned substantially parallel said front surface of said back panel when said side panels are in said closed position;

wherein one of said side panels has a slot extending therethrough from said upper edge of said side panel towards said lower edge of said side panel;

a pair of fasteners being extended from said bottom panel, one of said fasteners coupling one of said side panels to said bottom panel and another of said fasteners coupling another of said side panels to said bottom panel when said side panels are in said open position, wherein each of said fasteners comprises a hooks and loops fasteners;

a support structure being extended from said lower surface of said bottom panel for supporting said bottom panel in a spaced apart relation from a surface, said support structure being pivotally coupled to said lower surface of said bottom panel, wherein said support structure comprises a pair of legs, said legs being hingedly coupled to said lower surface of said bottom panel;

wherein each of said legs is pivotable between an extended position and a collapsed position, said legs being positioned generally perpendicular said lower surface of said bottom panel when said legs are in said deployed position, said legs being positioned generally parallel said lower surface of said bottom panel when said legs are in said retracted position;

wherein each of said legs is generally X-shaped, each said leg comprising a pair of elongate members being coupled together at a midpoint a shelf member being generally rectangular and slidably mounted on said lower surface of said bottom member, said shelf member having a flanged end; and a pair of guide members being coupled to said lower surface of said bottom panel, said shelf member being slidably inserted between said guide members.

14. A table for supporting a grill, said table comprising:

a bottom panel having an upper surface, a lower surface, a front, and a back;

a back panel being extended from said upper surface of said bottom panel, said back panel having a front surface, a rear surface, and a pair of ends, said back panel being hingedly coupled to said back of said bottom panel; and first and second side panels being extended from said front surface of said back panel, each of said side panels having an inner surface and an outer surface, each of said side panels being hingedly coupled to a respective said end of said back panel;

wherein each of said side panels has an upper edge and a lower edge, one of said side panels having a slot extending from said upper edge of said side panel towards said lower edge of said side panel.

15. The table of claim 14, further comprising a support structure for supporting said bottom panel in a spaced apart relation from a surface, said support structure being extended from said lower surface of said bottom panel.

16. The table of claim 15, wherein said support structure comprises a pair of legs being hingedly coupled to said lower surface of said bottom panel.

17. The table of claim 16, wherein each of said legs is generally X-shaped, each said leg having a pair of elongate members being coupled together at a midpoint.

18. The table of claim 14, further comprising a shelf member being slidably mounted on said lower surface of said bottom member, said shelf member having a flanged end.

19. The table of claim 14, further comprising a pair of fasteners coupling one of said side panels to said bottom panel.

20. The table of claim 19, wherein each of said fasteners comprises a hooks and loops fastener.

* * * * *